(12) United States Patent
Sloneker et al.

(10) Patent No.: US 6,909,271 B2
(45) Date of Patent: Jun. 21, 2005

(54) DEVICES, SYSTEMS, AND METHODS FOR MEASURING DIFFERENTIAL TEMPERATURE

(76) Inventors: Kenneth C. Sloneker, 217 Tunstall High Rd., Dry Fork, VA (US) 24549; Donald Polsky, 1020 Main St., Danville, VA (US) 24541; Anatoly Zhagrov, Lenin Ave., Zaporozhye State Engineering Academey, Zaporozhye 69006 (UA)

( * ) Notice: Subject to any disclaimer, the term of this patent is extended or adjusted under 35 U.S.C. 154(b) by 52 days.

(21) Appl. No.: 10/310,691

(22) Filed: Dec. 5, 2002

(65) Prior Publication Data

US 2003/0219060 A1 Nov. 27, 2003

Related U.S. Application Data

(60) Provisional application No. 60/336,590, filed on Dec. 5, 2001.

(51) Int. Cl.[7] .............................................. G01R 33/00
(52) U.S. Cl. .................................................. 324/117 R
(58) Field of Search ............................ 324/765, 158.1, 324/117 R, 117 H, 763, 760, 537; 361/94; 340/652, 501, 509; 374/179; 219/490

(56) References Cited

U.S. PATENT DOCUMENTS

| | | | |
|---|---|---|---|
| 3,468,164 A | * 9/1969 | Sutherland | ................... 374/142 |
| 3,521,164 A | * 7/1970 | Richman | ..................... 324/106 |
| 3,617,886 A | * 11/1971 | Werme | ......................... 324/90 |
| 3,906,721 A | 9/1975 | Micheli et al. | |
| 3,937,086 A | * 2/1976 | von Thuna | .................. 374/175 |
| 4,063,898 A | 12/1977 | Fisher | |
| 4,098,007 A | 7/1978 | Davis et al. | |
| 4,298,574 A | 11/1981 | Bohl | |
| 4,355,056 A | 10/1982 | Betta et al. | |
| 4,451,726 A | * 5/1984 | Anthony et al. | ............. 219/413 |
| 4,493,984 A | * 1/1985 | Yamauchi | .................... 219/501 |
| 4,765,943 A | 8/1988 | DeLorenzo et al. | |
| 4,835,108 A | 5/1989 | Cooper | |
| 5,373,737 A | * 12/1994 | Hwang | ..................... 73/204.22 |
| 5,644,463 A | * 7/1997 | El-Sharkawi et al. | .......... 361/94 |
| 5,646,520 A | * 7/1997 | Frank et al. | .............. 324/158.1 |
| 5,982,014 A | 11/1999 | Paige | |

OTHER PUBLICATIONS

Callen, Herbert B., "Thermodynamics an Introduction to the Physical Theories of Equilibrium Thermostatics and Irreversible Thermodynamics", © 1960, second printing May 1961, entire book, John Wiley & Sons, Inc., New York/London.

* cited by examiner

*Primary Examiner*—Vinh Nguyen
*Assistant Examiner*—Tung X. Nguyen
(74) *Attorney, Agent, or Firm*—Michael Haynes PLC

(57) ABSTRACT

At least one exemplary embodiment of the present invention includes a method comprising providing an input signal from a first differential temperature sensor to a first primary coil of a transformer, and detecting a transient signal from a secondary coil of the transformer, said transient signal arising upon a halting of the input signal.

39 Claims, 8 Drawing Sheets

DEVICES, SYSTEMS, AND METHODS FOR MEASURING DIFFERENTIAL TEMPERATURE

CROSS REFERENCE TO RELATED APPLICATIONS

This application claims priority to, and incorporates by reference in its entirety, U.S. Provisional Patent Application Ser. No. 60/336,590, filed Dec. 5, 2001, titled "System for Measurement of Temperature Differentials and Minute Current Flow".

BRIEF DESCRIPTION OF THE DRAWINGS

The wide variety of potential embodiments of the present invention will be more readily understood through the following detailed description, with reference to the accompanying drawings in which.

DETAILED DESCRIPTION

Certain embodiments of the present invention provide a method comprising providing an input signal from a first differential temperature sensor to a first primary coil of a transformer, and detecting a transient signal from a secondary coil of the transformer, said transient signal arising upon a halting of the input signal.

Certain embodiments of the present invention provide a method comprising detecting a transient signal from a secondary coil of a transformer, the transient signal arising upon an interruption of an input signal from a current-producing transducer provided to a first primary coil of the transformer; and providing a current to the second primary coil of the transformer to cause an energy present in the transient signal to equal a reference energy present in a reference transient signal produced by the secondary coil of the transformer when no temperature differential is sensed by the current-producing transducer.

Certain embodiments of the present invention provide a system comprising a first differential thermocouple sensor electrically coupled to a first modulator having a duty cycle, an output of said first modulator electrically coupled to a first primary coil of a transformer, and a second differential thermocouple sensor electrically coupled to a second modulator having a duty cycle, said second modulator electrically coupled to a second primary coil of said transformer, said first primary coil balanced with said second primary coil, a secondary coil of said transformer electrically coupled to said first a processor adapted to detect a transient output of said secondary coil of said transformer and filter a steady-state output of said secondary coil of said transformer.

Figure 1:
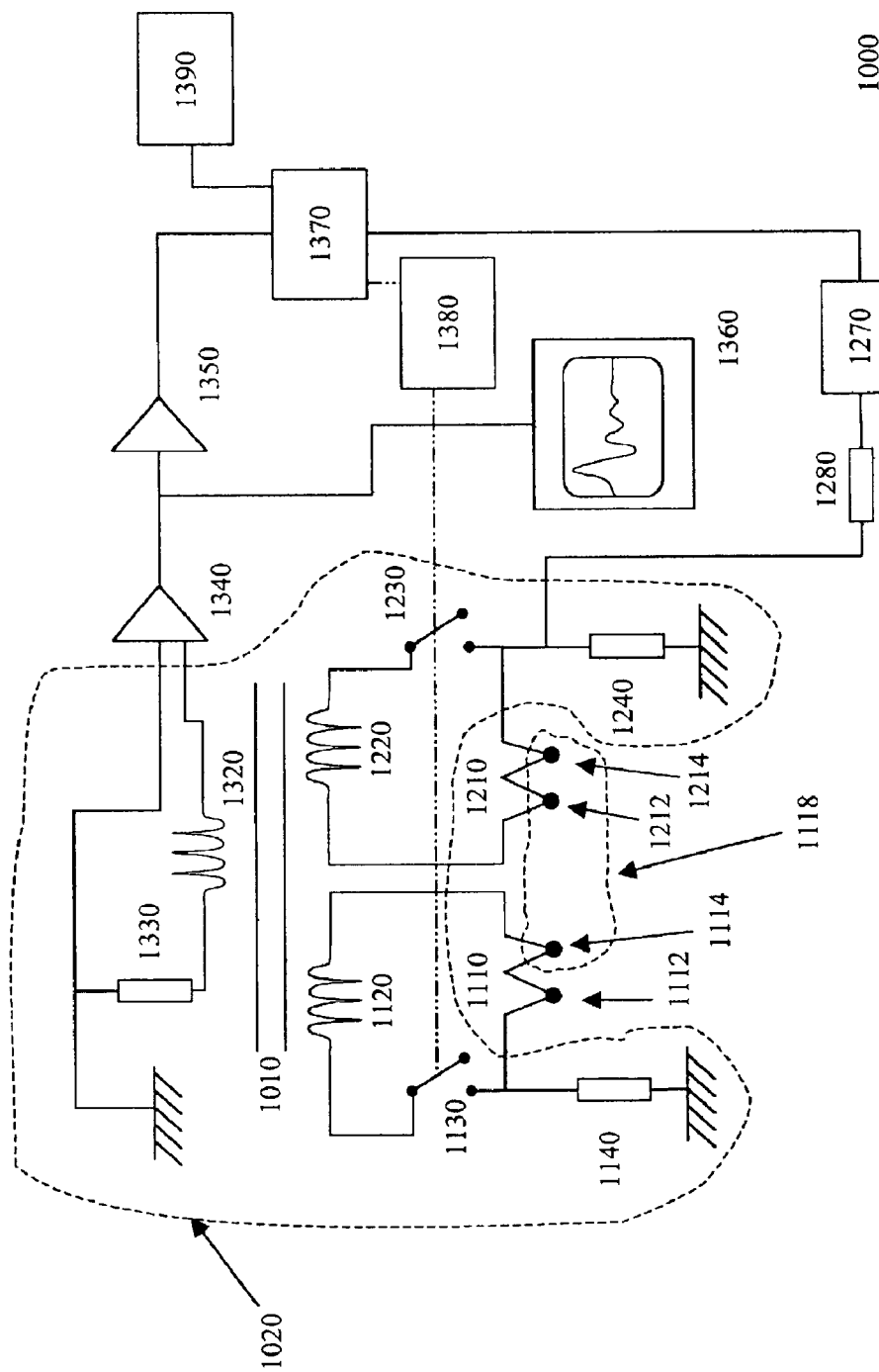
FIG. 1 is a circuit diagram of an exemplary embodiment of a system 1000 of the present invention.

FIG. 1 is a circuit diagram of an exemplary embodiment of a system 1000 of the present invention. System 1000 can include a first differential thermocouple 1110 that can be electrically coupled to a first primary coil 1120 of a transformer 1010. First differential thermocouple 1110 can also be connected via a first controllable switch 1130, such as a field effect transistor (FET), and a resistor 1140 to ground.

System 1000 also can include a second differential thermocouple 1210 that can be electrically coupled to a second primary coil 1220 of transformer 1010. Second differential thermocouple 1210 can also be connected via a second controllable switch 1230, such as a field effect transistor (FET), and a resistor 1240 to ground. A balancing current device 1270 can provide, via a resistor 1280, a current signal of a predetermined form, duration, amplitude, and/or direction through second differential thermocouple 1210.

The inputs of first and second primary coils can be balanced in terms of resistance, capacitance, and/or temperature coefficients. Any of resistors 1140 and/or 1240 can be of relatively low resistance, e.g. less than one ohm, and can have a very low temperature coefficient. Any resistor used in any embodiment, such as for example resistors 1140 and/or 1240, can be fabricated from a material having a very low temperature coefficient, such as for example, Mangininand/or Even Ohm.

In certain embodiments, controllable switches 1130 and/or 1230 can have a nearly infinite resistance in the "off" state and a nearly zero resistance in the "on" state. Certain FET's, such as the Phillips Semiconductor IRFZ44N and/or the International Rectifier IRL1404, which have an "on" state resistance of 22 milli-Ohms and 4 milli-Ohms, respectively. The state change time and/or slew rate can be on the order of approximately 10 to approximately 100 nanoseconds, including every value therebetween.

Any resistor of any embodiment (e.g., 1140, 1240, and/or 1211 (shown in FIGS. 6 and 7), switches 1130, 1230, and/or transformer 1010 can be thermally stabilized prior to and/or during use.

Transformer 1010 can also include a secondary coil 1320, which can be coupled via a grounded resistor 1330 to one or more amplifiers 1340. An amplified output of secondary coil 1320 can be provided to a A/D converter 1350, and then to a information device 1370. The analog and/or digital output of secondary coil 1320 can also be provided to an oscilloscope and/or spectrum analyzer 1360. Electrically coupled to information device 1370 can be an output device 1390. Information device 1370 can include and/or be coupled to a timing device 1380 that can trigger the opening and closing of switches 1130 and/or 1230. Information device 1370 can be coupled to current device 1270.

When switch 1130 opens its circuit, the magnetic field within transformer 1010 can collapse, permitting current flow and a transfer of energy from primary coil 1120 to secondary coil 1320 of transformer 1010. Likewise, when switch 1230 opens its circuit, the magnetic field within transformer 1010 can collapse, permitting current flow and a transfer of energy from primary coil 1220 to secondary coil 1320 of transformer 1010. The energy flow through secondary coil 1320 can comprise a transient output signal in the form of a signal pulse having a time dependent decay. The period of decay can be controlled by adjusting swamping resistor 1330 and/or other well-known circuit parameters.

As a result of a temperature differential between thermocouple junctions 1114, 1212, and 1214 in a uniform temperature zone 1118, and temperature at thermocouple junction 1112, an EMF will be generated and current will flow from the first differential thermocouple 1110 to first primary coil 1120 when switch 1130 is in a conductive state. Via current device 1150, information device 1370 can input current to the second or balancing primary coil 1220 such that a null output is produced at the secondary coil 1220. The amount of current necessary to produce the null output can be measured at current device 1150 and/or information device 1370 and employed to compute an output temperature differential signal which can be provided to an output device 1390, such as a monitor, display, printer, annunciator, speaker, and/or pager.

In practice, system 1000 can be first set to a null state, i.e. having no EMF or current flow through the secondary coil 1320. In theory, no current will flow through secondary coil 1320 if all thermocouple junctions, 1112, 1114, 1212, and 1214 are at the same temperature, i.e. there is no temperature differential.

Due to Nyquist noise, Johnson noise, parasitic voltages, capacitance, thermal junction EMF and other factors, a minute current is generated even when all of the thermocouple junctions are at the same temperature.

In order to set the system to a null state, all of the thermocouple junctions can be set the same temperature and thereafter, a current can be applied to the balancing coil 1220 to adjust the output signal from the secondary coil 1320 to zero. Such nulling current ($I_x$) can be measured at the balancing current device 1250 and can be established as the null current level for the system.

The system can utilize the difference between the established null current level ($I_x$) (with all thermocouple junctions at the same temperature) and the current level ($I_y$) necessary to balance the system with a temperature differential between the junctions 1112, 1114 for the purpose of calculating the value of the temperature differential.

The difference ($I_d$) between the null current level and the balancing current level necessary to obtain a zero secondary coil output at the temperature difference, i.e. $I_x-I_y$ can be proportional to the degree of temperature difference between the thermocouple junctions 1112, 1114.

Utilizing device 1000, a temperature difference can be sensed to within approximately 0.005K, approximately 0.001K, approximately 0.0005K, and/or approximately 0.0001K, including every value therebetween.

Figure 2:
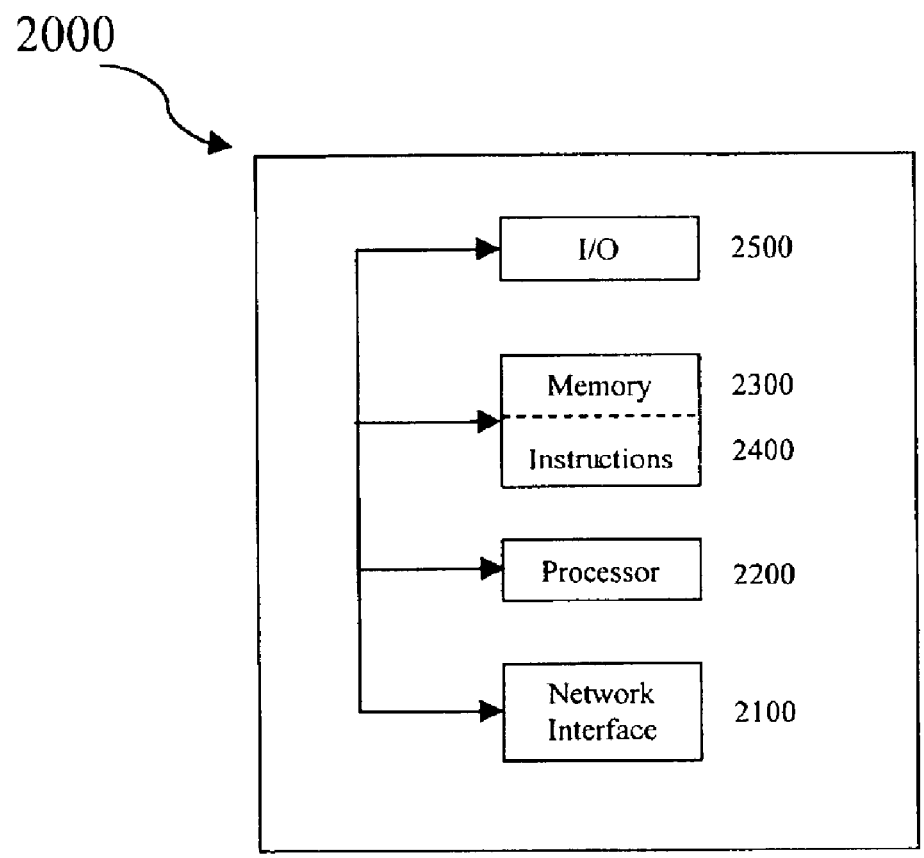
FIG. 2 is a block diagram of an exemplary embodiment of an information device 2000 of the present invention.

FIG. 2 is a block diagram of an exemplary embodiment of an information device 2000 of the present invention. Information device 2000 can represent information device 1370 of FIG. 1.

Information device 2000 can be implemented as a spectrum analyzer, on a general purpose or special purpose computer, such as a personal computer, workstation, minicomputer, mainframe, supercomputer, laptop, and/or Personal Digital Assistant (PDA), etc., a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing the at least a portion of a method described herein may be used.

Information device 2000 can include well-known components such as one or more communication interfaces 2100, one or more processors 2200, one or more memories 2300 containing instructions 2400, and/or one or more input/output (I/O) devices 2500, etc.

In one embodiment, communication interface 2100 can be a bus, a connector, a telephone line interface, a wireless network interface, a cellular network interface, a local area network interface, a broadband cable interface, a telephone, a cellular phone, a cellular modem, a telephone data modem, a fax modem, a wireless transceiver, an Ethernet card, a cable modem, a digital subscriber line interface, a bridge, a hub, a router, or other similar device.

Each processor 2200 can be a commercially available general-purpose microprocessor. In certain embodiments, the processor can be an Application Specific Integrated Circuit (ASIC) or a Field Programmable Gate Array (FPGA) that has been designed to implement in its hardware and/or firmware at least a part of a method in accordance with an embodiment of the present invention.

Memory 2300 can be coupled to processor 2200 and can comprise any device capable of storing analog or digital information, such as a hard disk, Random Access Memory (RAM), Read Only Memory (ROM), flash memory, a compact disk, a digital versatile disk (DVD), a magnetic tape, a floppy disk, and any combination thereof. Memory 2300 can also comprise a database, an archive, and/or any stored data and/or instructions. For example, memory 2300 can store instructions 2400 adapted to be executed by processor 2200 according to one or more activities of a method of the present invention.

Instructions 2400 can be embodied in software, which can take any of numerous forms that are well known in the art. Instructions 2400 can control operation of information device 2000 and/or one or more other devices, systems, or subsystems.

Input/output (I/O) device 2500 can be an audio and/or visual device, including, for example, a monitor, display, keyboard, keypad, touchpad, pointing device, microphone, speaker, video camera, camera, scanner, and/or printer, including a port to which an I/O device can be attached, connected, and/or coupled.

Figure 3:
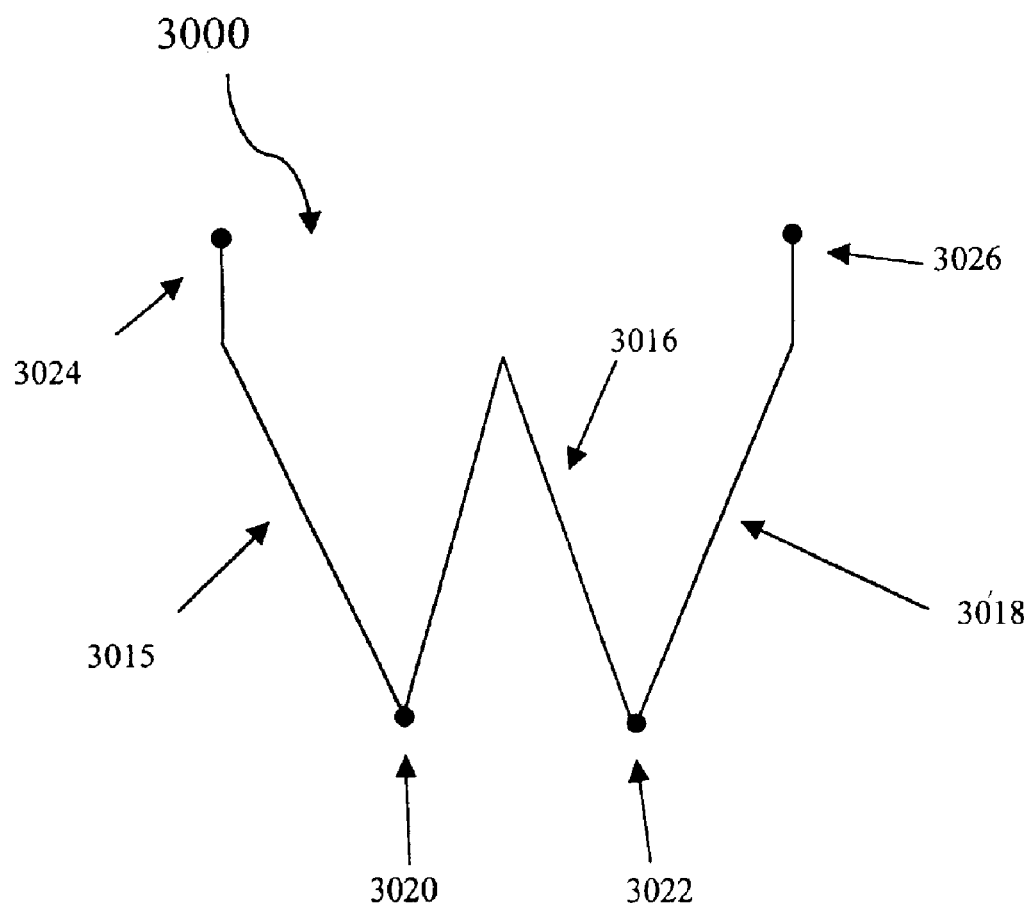
FIG. 3 is a block diagram of an exemplary embodiment of a differential thermocouple 3000 of the present invention.

FIG. 3 is a block diagram of an exemplary embodiment of a differential thermocouple 3000 of the present invention, which can represent differential thermocouple 1010 of FIG. 1. Differential thermocouple 3000 can comprise two dissimilar metals joined by brazing, welding, soldering or mechanical fastening, for example. Typical metals employed include copper and constantan.

A first leg 3015 of copper wire, tube, rod or strip having a known resistance is joined to a wire, tube, rod or strip of constantan 3016 at a junction 3020. To the other end of the constantan wire, tube, rod or strip 3016 is a second leg 3018, formed of copper, identical in resistance to the leg 3015. The second leg 3018 is joined to the constantan wire, tube, rod or strip 3016 at a junction 3022, with the junctions 3020, 3022 being formed by tungsten inert gas welds, of example only. The legs 3015, 18 have terminal ends 3024, 3026, respectively. An electromotive force is developed across the terminal ends 3024, 3026 of the legs 3015, 3018, in accordance with the equation: EMF=$S_{AB}$ (T1–T2) where $S_{AB}$ is the Seebeck coefficient for the legs 3015, 3018 and the constantan wire, rod or strip 3016 and T1 and T2 are the temperatures at the junctions 3020, 3022, respectively.

Figure 4:
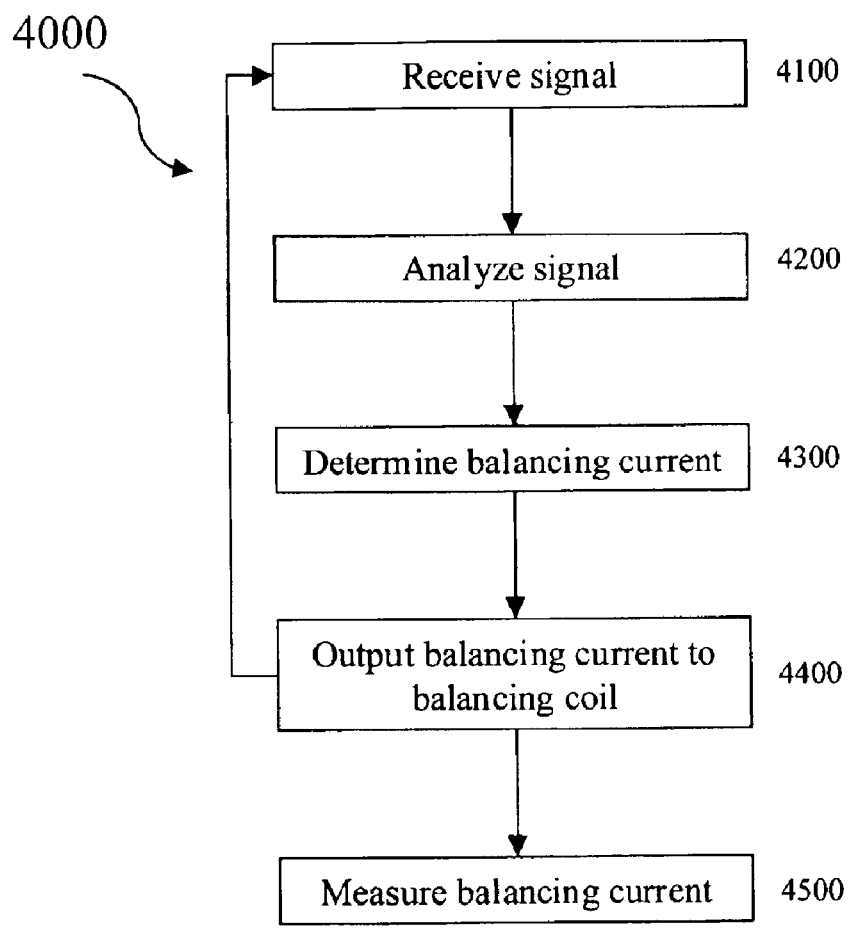
FIG. 4 is a flow diagram of an exemplary embodiment of a method 4000 of the present invention.

FIG. 4 is a flow diagram of an exemplary embodiment of a method 4000 of the present invention. An analog transient signal, synchronized with the switching of the switches 1130, 1230 through the timing device 1380, can be generated as an output of amplifier 1340. The analog transient signal can be converted to a digital transient signal at A/D converter 1350. At activity 4100, the digital transient signal can be received at information device 1370.

At activity 4200, the digital transient signal then can be analyzed to generate a total energy value $E_{sig}$ pursuant to the following algorithm:

$$E_{sig} = \frac{\lim_{n \to 30} \sum_{i=1}^{n} \left( \int_{t_1}^{t_2} |V| dv \right)}{n} \quad \text{(Equation 1)}$$

wherein n=the number of times integration is performed.

Essentially, a trigger point on the digital transient signal can be obtained and counted for a fixed period of time to sum the total energy in the transient signal and generate a total energy sum. Integration of all amplitudes over the time period can produce a $E_{sig}$ value representative of the energy present for the predetermine time period in the transient signal. An average of integrated readings, e.g. seven reading, can be employed to improve accuracy.

At activity 4300, the value $E_{sig}$ can employed to determine a balancing current $I_x$ necessary to be applied to the balancing primary coil 1220, in order to reduce $E_{sig}$ to a zero value. Expressed mathematically, $$I_x = \lim_{E_{sig} \to 0} f(E_{sig}) \quad \text{(Equation 2)}$$

At activity 4400, information device 1370 can output, and/or signal balancing current device 1250 to output, the balancing current $I_x$. At activity 4500, the balancing current $I_x$ can be measured at information device 1370 and/or balancing current device 1250.

Figure 5:
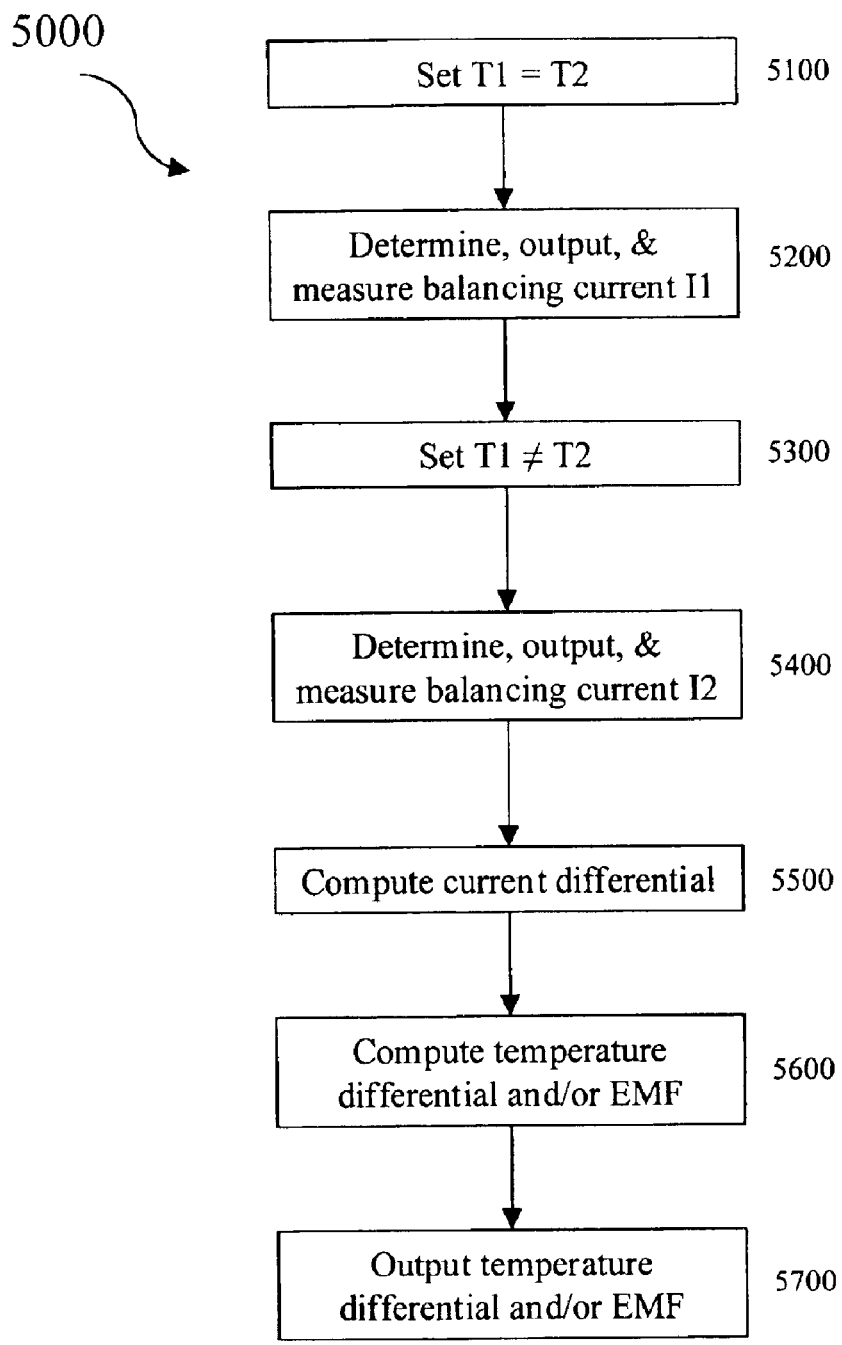
FIG. 5 is a flow diagram of an exemplary embodiment of a method 5000 of the present invention.

FIG. 5 is a flow diagram of an exemplary embodiment of a method 5000 of the present invention. Method 5000 can include method 4000.

At activity 5100, the temperature $T_1$ at junction 1112 can be allowed to approach the temperature $T_2$ at junction 1114. At activity 5200, using method 4000, a corresponding balancing current $I_1$ can be determined, output, and measured. At activity 5300, the temperature $T_1$ at 1112 can be set to a value other than the temperature $T_2$ of 1114. At activity 5400, using method 4000, a corresponding balancing current $I_2$ can be determined, output, and measured. At activity 5500, a current differential $I_d=|I_1-I_2|$ can be computed.

At activity 5600, a corresponding temperature differential and/or EMF, both of which are functions of $I_d$, can be computed. At activity 5700, the corresponding temperature differential and/or EMF can be output from information device 1370 to output device 1390.

To reduce interference, the timing device 1380 can be triggered in phase with line current power supply, e.g. 60 cycle. For example, the timing device can be triggered as the slope of the power supply wave approaches zero. Pattern jitter does not necessarily have a significant effect on the amplitude of the signal when the slope at the trigger point is near zero, i.e. at the peak or valley of the AC sine wave.

Utilization of an isothermal zone 1020 depicted in dashed lines in FIG. 1 can serve to reduce external thermal influences on the transformer, resistors, and/or switches, and/or can substantially reduce adverse effects of noise. The components within zone 1020 can be placed inside a sealed housing at or below a pressure of one millitorr. The components can be coupled thermally, but not electrically, to a temperature controlled isothermal plate.

Elimination of junction thermo currents and condensation can be achieved, because the cold side of the isothermal plate can be placed within the housing.

The plate can be controlled to a fixed value temperature, dependent upon system requirements. Typically the temperature can be maintained at between approximately 273° K to a theoretical value of 0° K, including every value therebetween.

The housing can be fabricated of a material with high thermal conductivity, e.g. one or more metals such as aluminum or copper. The bottom surface of the housing can dissipate heat from the isothermal plate within the housing. The temperature of exterior surfaces of the housing generally should not be low enough to permit condensation and an increase in local humidity.

Thermoelectric modules controlled by an independent or integrated controller can be employed to cool the isothermal plate. Heat discharged from the thermoelectric modules can be directed toward the housing to keep the exterior of the housing above the dew point.

In lieu of thermoelectric modules, cryogenic fluids such as liquid nitrogen can be utilized to cool the isothermal zone within the chamber. Further, thermo piles and/or Peltier coolers can be embedded directly into the isothermal plate.

Additionally, pure and/or inert dry gases can be employed within the chamber to enhance heat conduction without introducing air. Such control of the environment can reduce system instability attributed to temperature and/or humidity, e.g. can eliminate the effects of changes in magnetic permeability of the air within the transformer.

Figure 6:
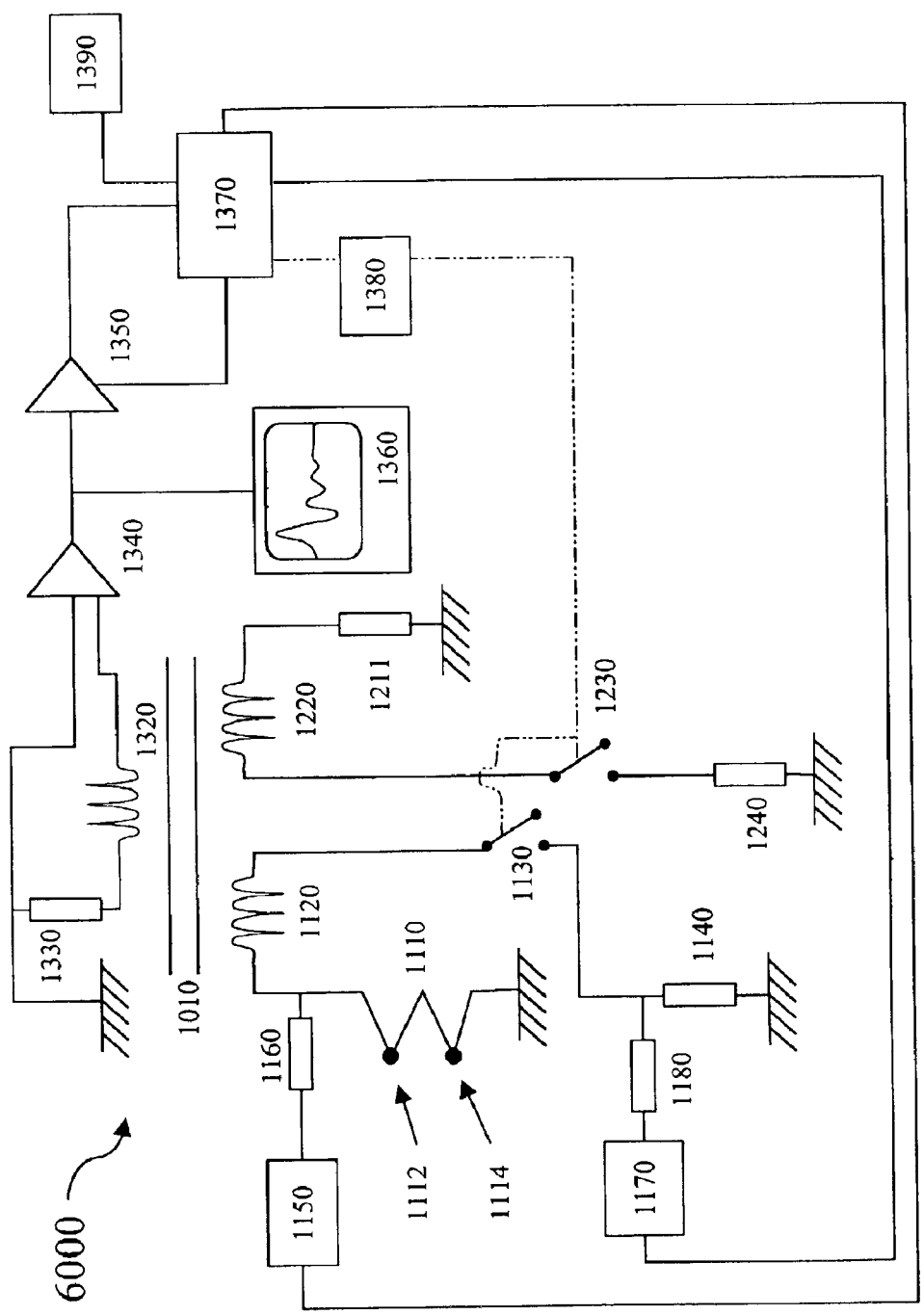
FIG. 6 is a circuit diagram of an exemplary embodiment of a system 6000 of the present invention.

FIG. 6 is a circuit diagram of an exemplary embodiment of a system 6000 of the present invention. System 6000 can resemble system 1000 of FIG. 1. The second differential thermocouple 1210 of FIG. 1 can be eliminated and a balancing grounded resistor 1240 can be added, as shown in FIG. 6.

As also shown in FIG. 6, a first primary current supply device 1150 and associated resistor 1160 can be connected to the first primary thermocouple circuit.

First primary current supply device 1150 can provide, via a resistor 1160, a current signal of a predetermined form, duration, amplitude, and/or direction through first differential thermocouple 1110. For example, first primary current supply device 1150 can provide a 200 milliamp current in a first direction through differential thermocouple 1110 for a predetermined time, followed by a 200 milliamp current in the opposite direction for the same period of time.

Figure 7:
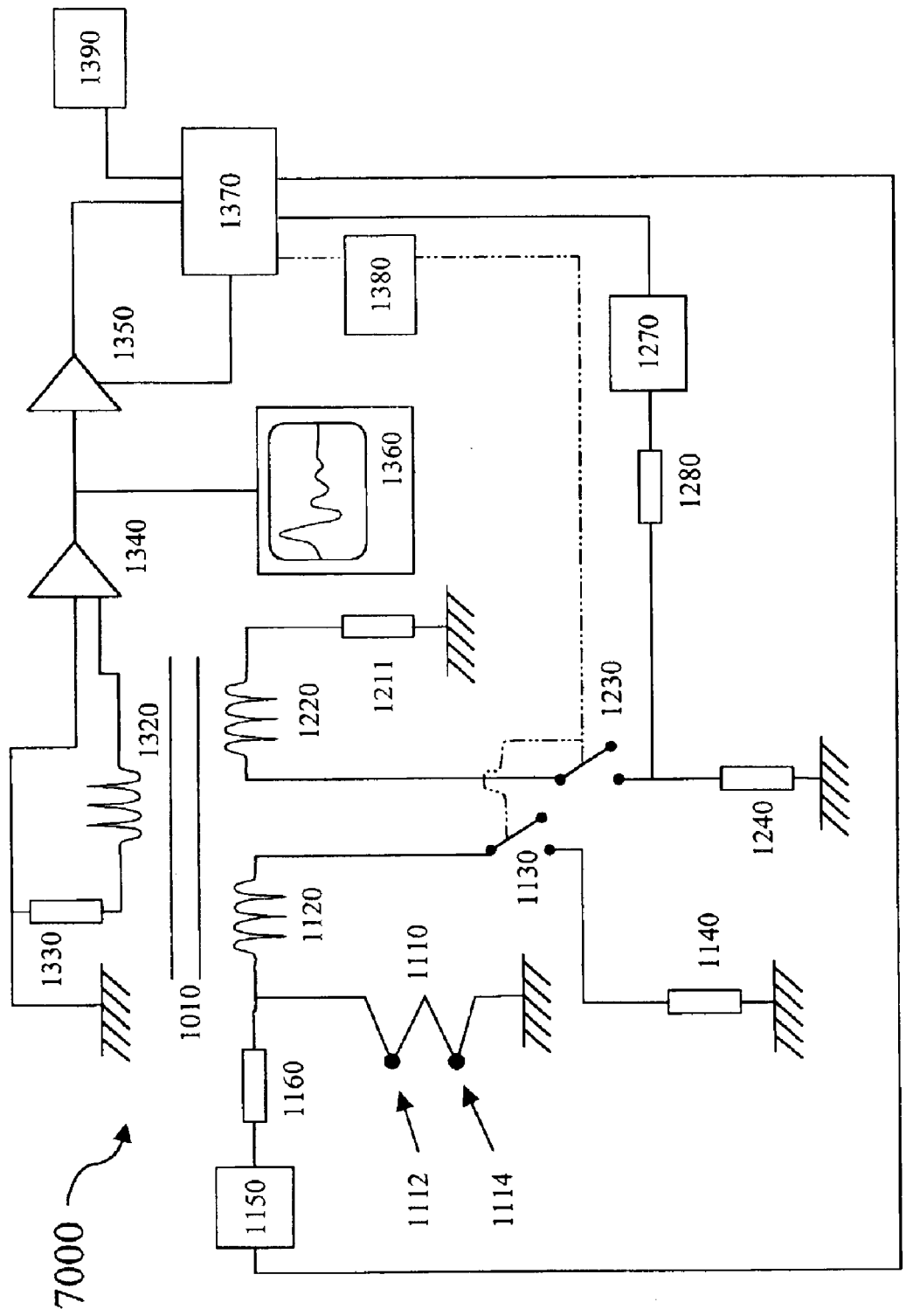
FIG. 7 is a circuit diagram of an exemplary embodiment of a system 7000 of the present invention.

FIG. 7 is a circuit diagram of an exemplary embodiment of a system 7000 of the present invention. System 7000 can substantially resemble system 6000 of FIG. 6. The balancing current device 1170 and associated resistor 1180 of FIG. 6 can be moved to the second primary circuit and renumbered as balancing current device 1270 and associated resistor 1280, as shown in FIG. 7, and can provide a current signal of a predetermined form, duration, amplitude, and/or direction through the second primary coil 1220.

An implementation of system 6000 and/or system 7000 can be theoretically viewed as being governed by certain equations, some of which can be found in "Thermodynamics, An Introduction to the Physical Theories of Equilibrium Themostatics and Irreversible Thermodynamics", by Herbert B. Callen, published by John Wiley & Sons, Inc., New York, May 1961, which is incorporated herein by reference in its entirety.

Other theoretical views of various embodiments are possible. For example, consider a differential thermocouple (e.g., 1110) composed of two thermoelement materials, A and B, with absolute Seebeck coefficients of SA and SB, and a relative Seebeck coefficient of S. Characterization of the voltage-current characteristic of this thermocouple can show small non-linearities. The voltage across the thermocouple can be given by:

$$E = E_0 + R_e I + Q R_{th} S \quad \text{(Equation 3)}$$

where $E_0$ is the Seebeck voltage for the zero current case,
Re is the electrical resistance of the thermocouple loop,
I is the current, Q is the heat transferred by the Peltier effect away from the A/B junction and into the B/A junction, $R_{th}$ is the thermal resistance of the junctions with their environment, and S is the Seebeck coefficient.

The second term on the right side of Equation 1 can be expanded to explicitly show the effects of Joule heating:

$$R_e I = (R_0 + \alpha \Delta T) I \approx (R_0 + \alpha C I^2) I \quad \text{(Equation 4)}$$

where $\alpha$ is the thermal coefficient of resistance of the wire, and C is a constant.

The third term on the right side of equation 1) can be simplified using the relation between the Peltier coefficient $\Pi$ and the Seebeck coefficient, $\Pi = S\,T$:

$$Q = \Pi I = S T I \quad \text{(Equation 5)}$$

The result for the third term, divided by current is:

$$E(\text{Peltier})/I = R_{th} S^2 T \quad \text{(Equation 6)}$$

Thus, the ratio E(Peltier)/I can be proportional to absolute temperature, with a mathematical proportionality constant of $R_{th} S^2$.

The $R_e$ term can be separated from the Peltier term in a series of measurements. $R_0$ can be independent of the measurement speed, whereas the Joule heating and Peltier effects can require a temperature non-uniformity to develop over several milliseconds to seconds. Furthermore, the Joule heating can enter as a higher power of current compared to the Peltier effect. Thus, the three terms can be distinguished by establishing the current-voltage characteristic of the differential thermocouple, for example, at several frequencies.

The thermal resistance of the junction to its environment can be dependent on the following properties: thermal conductivity of the thermocouple elements; thermal conductivity of any sheath materials surrounding the elements, and/or thermal transport properties of the environment in which the thermocouple is immersed. In general, each of these properties will be temperature dependent.

The Seebeck coefficient can be temperature dependent as well. For some combinations (type B, for example), the sign of S can even change.

The prefactor $(R_{th} S^2)$ consequently can depend on the choice of thermocouple type, and for any thermocouple type the value of the prefactor can depend on temperature. A measurement of E(Peltier)/I alone does not necessarily give a direct measure of absolute temperature. A measurement of the prefactor, or via a separate combination of measurements, the components of the prefactor, can provide a method for directly measuring absolute thermodynamic temperature.

Figure 8:
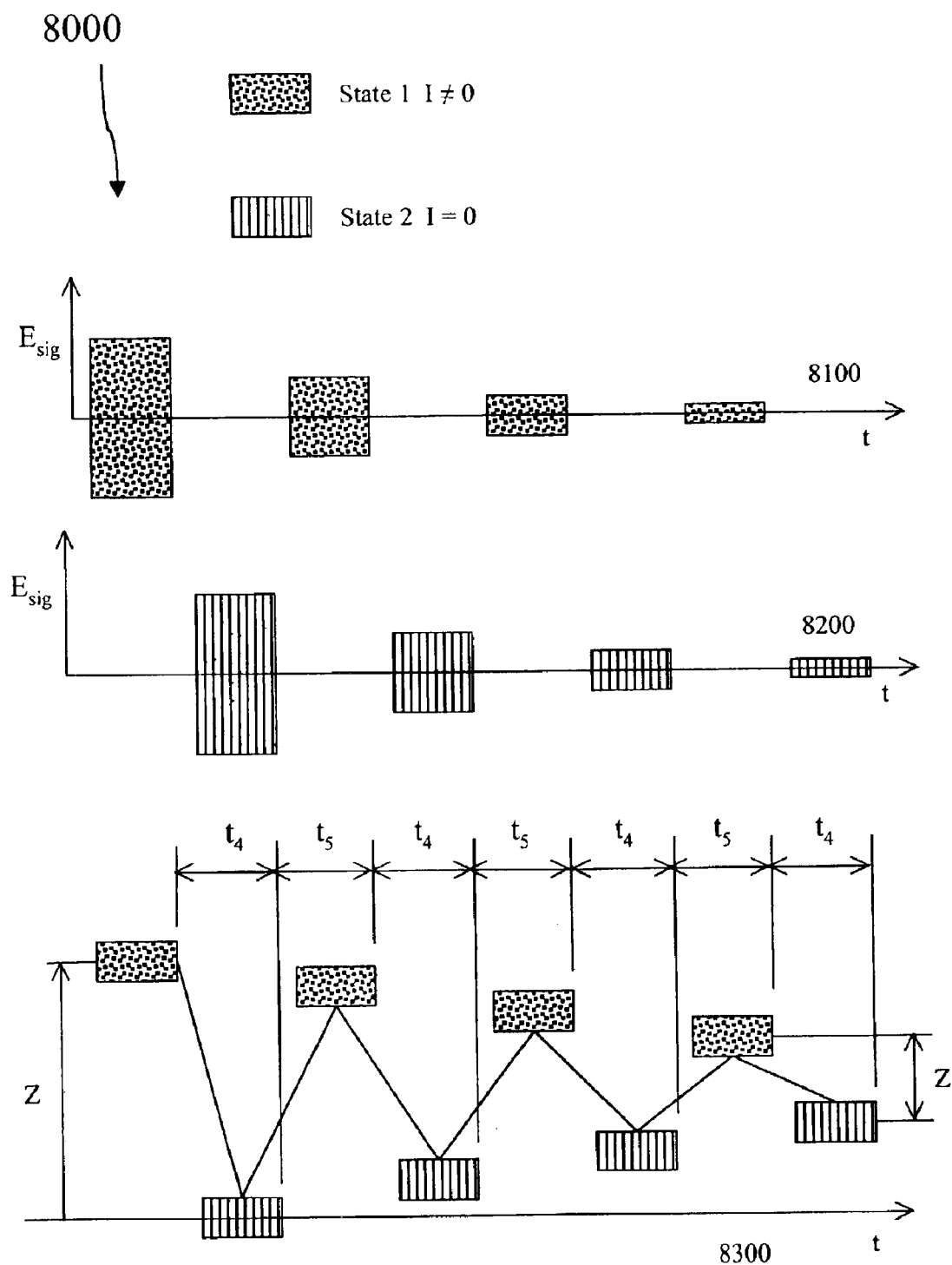
FIG. 8 is a set of inter-linked timing diagrams of an exemplary embodiment of a method 8000 of the present invention.

FIG. 8 is a set of inter-linked timing diagrams of an exemplary embodiment of a method 8000 of the present invention that can provide such a direct measure of absolute thermodynamic temperature. Timing diagram 8100 depicts a State 1, where $I \neq 0$, and timing diagram 8200 depicts a State 2, where $I = 0$. As a general note, in certain alternative embodiments, openings and/or closings of one or more switches and/or circuits described herein can be reversed.

For State 1, with the temperature differential of the thermocouple junctions, $T_2 - T_1$, approximately equal to 0, using method 4000, a balancing current $I_x$ can be iteratively determined that drives $E_{sig}$ to zero or nearly zero, as limited by the sensitivity of the measuring instruments. A State 1 EMF corresponding to $I_x$ can then be computed.

For State 2, referring to FIG. 6, the circuit between first primary coil 1120 and ground can be opened via switch 1130 so that current does not flow through coil 1120. First primary current source 1150 can supply a "push" current $I_1$ through thermocouple 1110 in a first direction for a time t1, followed by "pull" current 12 through 1110 in a second, opposite direction for a time t2, where $I_1 = I_2$, and $t_1 = t_2$. Then, the circuit between first primary coil 1120 and ground can be completed via switch 1130 so that current does flow through and charges coil 1120 for a time t3=t2=t1.

Next, the circuit between first primary coil 1120 and ground can be opened via switch 1130 so that a transient signal is generated from secondary coil 1320. Using method 4000, a balancing current $I_y$ can be iteratively determined that drives $E_{sig}$ to zero or nearly zero, as limited by the sensitivity of the measuring instruments. A State 2 EMF corresponding to $I_y$ can then be computed, and a differential EMF $= \Delta$EMF $= |(\text{State 1 EMF} - \text{State 2 EMF})|$ can be computed. Also, a time interval $t_4$ can be measured from the time the final $I_x$ is determined to the time the final $I_y$ is determined.

Next, first primary current source 1150 can be set to supply no current, i.e., $I_1 = I_2 = 0$, and the switch can be closed to allow an internal current of the thermocouple can be allowed to flow through first primary coil 1120 to ground. The switch can be opened to generate a transient signal from the secondary coil.

Then, the process can return to State 1, and a time interval t5 can be measured from the time the final $I_y$ is determined to the time the final $I_x$ is determined.

The process can iteratively continue through State 1 and State 2 until $\Delta$ EMF converges on a constant and/or the change in $\Delta$ EMF converges on 0. The constant value to which $\Delta$ EMF converges represents the temperature change in the thermocouple due to Peltier effects. Method 8000 can be repeated as many times as needed to improve the accuracy of the $\Delta$ EMF determination. Time intervals $t_1$, $t_2$, $t_3$, $t_4$, and/or $t_5$, and/or the work cycle employed in method 8000 can be utilized to compute absolute temperature. A theoretical basis for these computations can be found in, for example, the explanation provided by Callen (referenced supra).

In addition, method 8000 can include determining a Peltier coefficient and/or Peltier effect of the differential thermocouple independently of EMF. Method 8000 also can include determining an EMF time rate of change due to the Peltier work cycle, thermophysical properties (e.g., materials of construction, specific heat, thermal conductivity, heat capacity, etc.) of the sensor and/or its surrounding environment, and/or a degree of thermal coupling between the sensor and the surrounding environment (e.g., how well the sensor is thermally connected to environment and/or how well heat is exchanged between the sensor and the environment).

From measurement of the Peltier effect at various temperatures, the thermodynamic temperature scale can be realized. The resolution of the absolute temperature measurements that provide this scale can be from approximately 100 mK to approximately 10 mK to approximately 1 mK to approximately 0.1 mK, and every value therebetween.

Various embodiments can allow the Peltier work cycle to be related directly to true thermodynamic temperature or absolute temperature. Because a practical temperature scale is not necessarily required, this advancement can allow improvements in many systems of measurement that depend on temperature measurements. Various embodiments present the possibility, minus losses, of measuring heat directly in terms of a work cycle.

There are numerous potential applications for various embodiments of the present invention. For example:

Fundamental physical constants can be improved. For example, the accuracy of Boltzman's constant (k) can possibly be improved by realizing the thermodynamic temperature term of the fundamental gas law.

A sensor's thermal coupling to its environment can be assessed.

The practical temperature scale can be improved. For example, the distance between the thermal energy states of the triple point of water and the triple point of Gallium, respectively, can be determined with greater accuracy and/or precision.

Thermal properties of materials, such as for example, thermal conductivity, specific heat, etc. can be measured more accurately and/or precisely.

A better understanding of the conversion of heat to energy, and/or energy to heat, can be obtained by measurement.

Thermocouples can be used for accurate measurements without the need for recalibration as the long term EMF shifts occurring during use will not necessarily effect the work cycle measurement.

The system can measure the work cycle of all thermocouple types without specifying the type.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A method, comprising:
providing an input signal from an EMF-producing first differential temperature sensor to a first primary coil of a transformer,
detecting a transient signal from a secondary coil of the transformer, said transient signal arising upon a halting of the input signal.

2. The method of claim 1, further comprising surrounding at least a portion of the first differential temperature sensor with an isothermal zone.

3. The method of claim 1, further comprising surrounding a cold end portion of the first differential temperature sensor with an isothermal zone.

4. The method of claim 1, further comprising thermally connecting an isothermal plate to the transformer.

5. The method of claim 1, further comprising thermally connecting an isothermal plate to a resistor connected to the transformer.

6. The method of claim 1, further comprising thermally connecting an isothermal plate to a transistor connected to the transformer.

7. The method of claim 1, further creating a stable isothermal zone for the transformer and a connection to a cold end portion of the first differential temperature sensor.

8. The method of claim 1, further comprising exposing the first differential temperature sensor to a differential temperature.

9. The method of claim 1, further comprising exposing a hot end of the first differential temperature sensor to a differential temperature.

10. The method of claim 1, further comprising modulating a DC signal from the first differential temperature sensor to form the input signal.

11. The method of claim 1, further comprising modulating a DC signal from the first differential temperature sensor to form the input signal, the input signal resembling a square wave.

12. The method of claim 1, further comprising modulating a DC signal from the first differential temperature sensor to form the input signal, the input signal resembling a square wave having a duty cycle.

13. The method of claim 1, further comprising modulating a DC signal from the first differential temperature sensor to form the input signal, the input signal resembling a square wave having an uneven duty cycle.

14. The method of claim 1, further comprising modulating a DC signal from the first differential temperature sensor to form the input signal, the input signal resembling a square wave having a phase matched to an AC power source coupled to a modulator that causes said modulating.

15. The method of claim 1, further comprising attaching a second differential temperature sensor to a second primary coil of the transformer.

16. The method of claim 1, further comprising attaching a second differential temperature sensor to a second primary coil of the transformer and providing a balancing signal to the second input coil.

17. The method of claim 1, further comprising balancing the input signal with a balancing signal.

18. The method of claim 1, further comprising correlating an average total energy present in the transient signal to a zero temperature differential sensed by the differential temperature sensor.

19. The method of claim 1, further comprising measuring energy in the transient signal.

20. The method of claim 1, further comprising measuring a form of the transient signal.

21. The method of claim 1, further comprising determining total energy in the transient signal over a fixed period of time.

22. The method of claim 1, further comprising providing a current to a second primary coil of the transformer to cause ma energy present in the transient signal to equal a zero-state energy present in a zero-state transient signal produced when a zero temperature differential is sensed by the differential temperature sensor.

23. The method of claim 1, further comprising providing a current to a second primary coil of the transformer to cause an energy present in the transient signal to equal a zero-state energy present in a zero-state transient signal produced when a zero temperature differential is sensed by the differential temperature sensor, end correlating the provided current to a temperature differential sensed by the differential temperature sensor.

24. The method of claim 1, further comprising applying a current to the temperature differential sensor.

25. The method of claim 1, further comprising applying a first current to the temperature differential sensor in a first direction.

26. The method of claim 1, further comprising applying a first current to the temperature differential sensor in a first direction, and applying a second current to the temperature differential sensor in a second, opposite direction.

27. The method of claim 1, further comprising applying a first current to the temperature differential sensor for a first time period, and applying a second current to the temperature differential sensor in a direction opposite to that of the first current for a second time period.

28. The method of claim 1, further comprising applying a first current to the temperature differential sensor for a first time period, and applying a second current to the temperature differential sensor in a direction opposite to that of the first current for a second time period, said second current equal in magnitude to said first current.

29. The method of claim 1, further comprising applying a first current to the temperature differential sensor for a first time period, and applying a second current to the temperature differential sensor in a direction opposite that of the first current for a second time period, said first time period equal to said second time period.

30. The method of claim 1, further comprising applying a first current to the temperature differential sensor for a first time period, and applying a second current to the temperature differential sensor in a direction opposite that of the first current for a second time period, the second current equal to the first current, and correlating a Peltier effect associated with the temperature differential sensor.

31. The method of claim 1, further comprising measuring a Pettier effect associated with the differential temperature sensor.

32. The method of claim 1, further comprising quantifying a Peltier effect associated with the differential temperature sensor.

33. The method of claim 1, further comprising determining a Peltier effect associated with the differential temperature sensor.

34. The method of claim 1, further comprising compensating for a Peltier effect associated with the differential temperature sensor.

35. The method of claim 1, further comprising determining a temperature differential sensed by the differential temperature sensor.

36. The method of claim 1, further comprising determining a temperature differential sensed by the differential temperature sensor to within 0.001 K.

37. The method of claim 1, further comprising determining a temperature differential sensed by the differential temperature sensor to within 0.0001 K.

38. The method of claim 1, wherein the differential temperature sensor is a differential thermocouple.

39. The method of claim 1, wherein the differential temperature sensor comprises one or more p-n semiconductor elements.

* * * * *